(12) United States Patent
Chang et al.

(10) Patent No.: US 12,511,070 B2
(45) Date of Patent: Dec. 30, 2025

(54) MEMORY SUB-SYSTEM SLOW PROGRAM DETECTION

(71) Applicant: Micron Technology, Inc., Boise, ID (US)

(72) Inventors: Chia Wei Chang, Gukeng Township (TW); Chia Yu Kuo, Hukou Town (TW); Tzu Ting Tseng, Hsinchu (TW); Pinhsueh Lai, New Taipei (TW)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/680,736

(22) Filed: May 31, 2024

(65) Prior Publication Data

US 2024/0427518 A1    Dec. 26, 2024

Related U.S. Application Data

(60) Provisional application No. 63/522,211, filed on Jun. 21, 2023.

(51) Int. Cl.
*G06F 12/00* (2006.01)
*G06F 3/06* (2006.01)

(52) U.S. Cl.
CPC .......... *G06F 3/0653* (2013.01); *G06F 3/0604* (2013.01); *G06F 3/0679* (2013.01)

(58) Field of Classification Search
CPC .... G06F 3/0653; G06F 3/0604; G06F 3/0679; G06F 3/061; G06F 3/0614; G06F 12/0238; G06F 2212/72
See application file for complete search history.

(56) References Cited

U.S. PATENT DOCUMENTS

| | | | |
|---|---|---|---|
| 9,437,321 | B2 | 9/2016 | Tseng et al. |
| 11,545,230 | B2 | 1/2023 | Chen et al. |
| 2018/0203774 | A1 | 7/2018 | Srinivasan et al. |
| 2021/0118517 | A1* | 4/2021 | Kang ............... G11C 16/10 |
| 2022/0066894 | A1* | 3/2022 | Namala ........... G11C 16/0483 |
| 2023/0023618 | A1* | 1/2023 | Zhang ............... G11C 16/30 |
| 2023/0066982 | A1 | 3/2023 | Lee et al. |
| 2023/0096408 | A1 | 3/2023 | Na et al. |
| 2023/0124303 | A1 | 4/2023 | Park et al. |
| 2024/0078023 | A1 | 3/2024 | Kim |

* cited by examiner

*Primary Examiner* — Shawn X Gu
(74) *Attorney, Agent, or Firm* — Brooks, Cameron & Huebsch, PLLC

(57) ABSTRACT

An example apparatus can include a program component. The program component can program each of a plurality of planes during different time periods subsequent to performing a multi-plane programming on a non-volatile memory array. The program component can monitor a program pulse count for each of the respective plurality of planes per super block. The program component can, in response to the program pulse count for a respective block within one of the plurality of planes being above a threshold pulse count, determine that the respective block is a bad block.

18 Claims, 5 Drawing Sheets

445

```
┌─────────────────────────────────────────────────┐
│ PROGRAM EACH OF A PLURALITY OF PLANES ONE AT A TIME │──446
│ SUBSEQUENT TO PERFORMING A MULTI-PLANE PROGRAMMING  │
│         ON A NON-VOLATILE MEMORY ARRAY              │
└─────────────────────────────────────────────────┘
                        │
                        ▼
┌─────────────────────────────────────────────────┐
│  MONITOR A PROGRAM PULSE COUNT FOR EACH BLOCK OF A  │──447
│  SUPER BLOCK OF EACH OF THE RESPECTIVE PLURALITY OF │
│                      PLANES                         │
└─────────────────────────────────────────────────┘
                        │
                        ▼
┌─────────────────────────────────────────────────┐
│         DETERMINE A PROGRAM PULSE THRESHOLD         │──448
└─────────────────────────────────────────────────┘
                        │
                        ▼
┌─────────────────────────────────────────────────┐
│      DETERMINE THAT THE RESPECTIVE BLOCK IS A GOOD BLOCK │──449
└─────────────────────────────────────────────────┘
```

*FIG. 4*

MEMORY SUB-SYSTEM SLOW PROGRAM DETECTION

PRIORITY INFORMATION

This application claims the benefits of U.S. Provisional Application No. 63/522,211, filed on Jun. 21, 2023, the contents of which are incorporated herein by reference.

TECHNICAL FIELD

Embodiments of the disclosure relate generally to memory sub-systems, and more specifically, relate to memory sub-system slow program detection.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 4 illustrates an example method for slow program detection in accordance with embodiments of the present disclosure.

DETAILED DESCRIPTION

Figure 1:
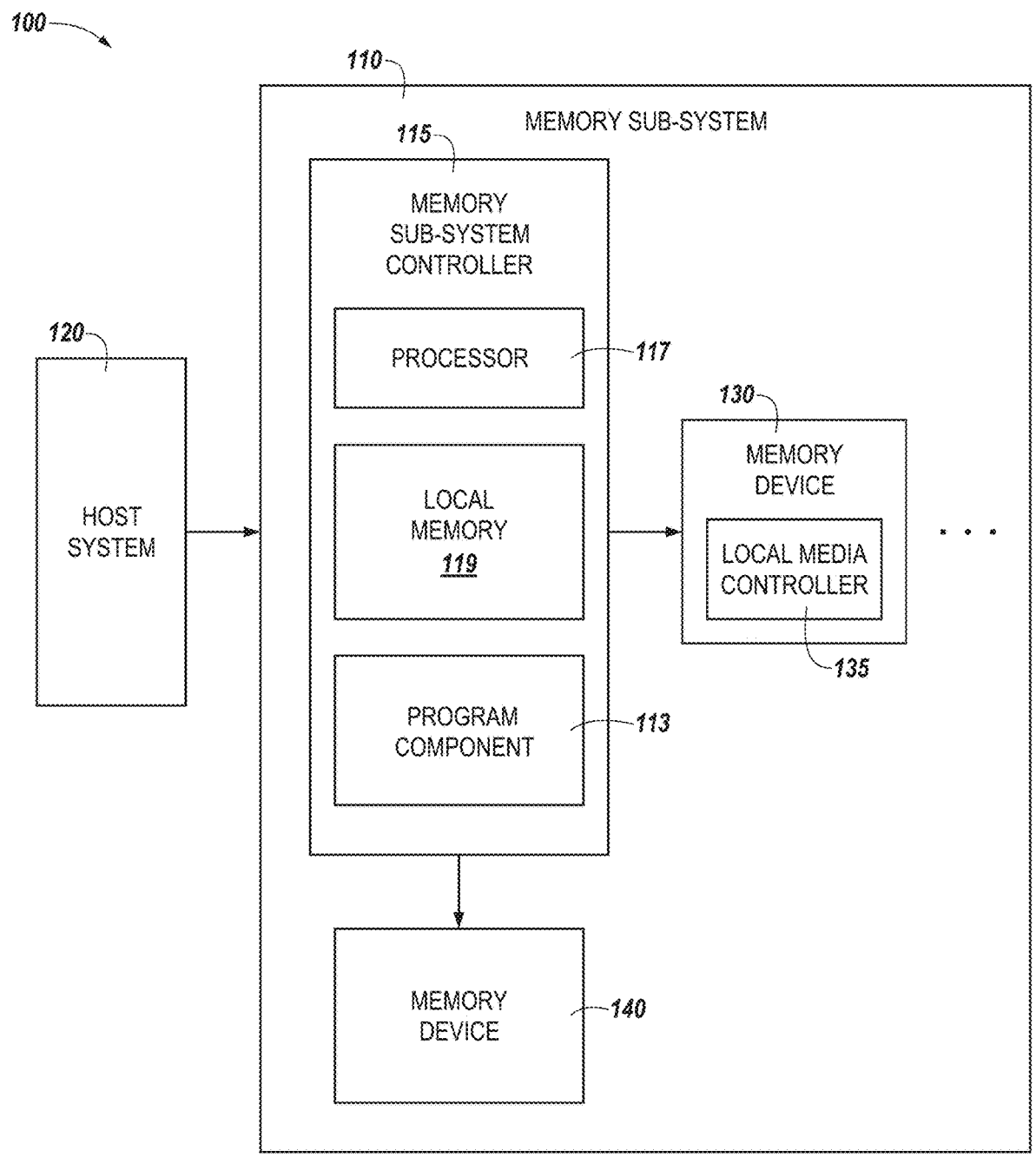
FIG. 1 illustrates an example computing system that includes a memory sub-system in accordance with some embodiments of the present disclosure.

Aspects of the present disclosure are directed to slow program detection with a memory sub-system, in particular to memory sub-systems that monitor and determine program pulse counts to detect slow programming of a particular block of memory. A memory sub-system can be a storage device, a memory module, or a hybrid of a storage device and memory module. An example of a memory sub-system is a storage system, such as a solid state drive (SSD). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

In some approaches, planes of memory cells in a memory array can be programmed using program pulses. In the instance of using multi-plane programming, program pulses can be performed on each of the planes across a memory array simultaneously. For example, a first block of a first superblock across a plurality of planes can receive program pulses at the same time. In response to at least one of the blocks in a particular superblock having a slow program rate, additional program pulses may be used to bring the voltage value to a target voltage value for the at least one block. Since the blocks across the plurality of planes are all receiving program pulses simultaneously, the other blocks not in the same plane as the at least one block are also receiving additional program pulses. The other blocks would therefore receive too many program pulses and develop errors. These errors can lead to the other blocks as being bad blocks, or as being unusable due to uncorrectable errors. However, the at least one block may be determined to be a good block and still usable even though the at least one block is the only block with an actual programming issue. The other blocks may then be discarded and replaced while the at least one block is continued to be used. This can create a cycle of discarding good blocks and maintaining the at least one bad block, which can lead to a crashing of the non-volatile memory array due to too many blocks being discarded.

In order to avoid this situation, multi-plane programming can include shifting from simultaneously programming each of the plurality of planes to single plane programming in response to particular criteria. The particular criteria can include determining that a program pulse count for a particular block exceeds a threshold program pulse count. In order to do so, a program pulse count for each of the blocks being programmed can be determined. The threshold program pulse count can be determined by summing the program pulse counts and finding a median or average program pulse count and determining an additional margin quantity above the median or average program pulse count. In this way, a block with a program pulse count that exceeds the threshold program pulse count can be removed or decommissioned from writing and avoid the cascading cycle of removing good blocks and each of the good blocks can continue to be written to.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative- and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a program component 113 that can be configured to orchestrate and/or perform operations to monitor program pulse counts of blocks of memory and/or determine threshold program pulse counts for a quantity of blocks of memory and can use various components, data paths, and/or interfaces of the memory sub-system 110 to do so. The program component 113 can include various hardware and/or circuitry to facilitate monitoring of superblocks and control of the storage of data in the memory cells of the memory devices 130, 140. For example, the program component 113 can include a special purpose circuitry in the form of an ASIC, FPGA, state machine, and/or other logic circuitry or software and/or firmware that can allow the program component 113 to orchestrate and/or perform data storage operations related to monitoring program pulse counts of superblocks and/or determining whether a particular program pulse count exceeds a threshold program pulse count to use for storage and communicate to various components, data paths, and/or interfaces of the memory sub-system 110.

The program component 113 can be communicatively coupled to the memory devices 130, 140 and can access the memory device 130, the memory device 140, internal data paths of the memory sub-system 110, and/or interfaces of the memory sub-system 110 to perform the operations described herein and/or to transfer storage data to additional elements of the memory sub-system 110. In some embodiments, the operations performed by the program component 113 can be performed during an initialization or pre-initialization stage of data transfer within the memory sub-system 110 and/or the memory sub-system controller 115.

In some embodiments, the memory sub-system controller 115 includes at least a portion of the program component 113. For example, the memory sub-system controller 115 can include a processor 117 (processing device) configured to execute instructions stored in local memory 119 for performing the operations described herein. In some embodiments, the program component 113 is part of the host system 110 (not illustrated), an application, or an operating system.

The memory devices 130, 140 in FIG. 1 can include a number of physical blocks in accordance with some embodiments of the present disclosure. For example, the memory devices 130, 140 can include a NAND flash memory array including the number of physical blocks. However, embodiments of the present disclosure are not limited to a particular type of memory or memory array. For example, the memory array can be a DRAM array, an RRAM array, or a PCRAM array, among other types of memory arrays. Further, the memory array can be located on a particular semiconductor die along with various peripheral circuitry associated with the operation thereof.

The memory cells of the memory array can be mixed mode cells operable as SLCs and/or XLCs (e.g., extra-level cells which can refer to cells operable at a level greater than SLCs, also referred to as non-SLC mode cells). The number of physical blocks in the memory array can be 128 blocks, 512 blocks, or 1,024 blocks, but embodiments are not limited to a particular multiple of 128 or to any particular number of physical blocks in memory array. Further, different portions of memory can serve as a dynamic SLC cache for media management operations, such as garbage collection. For example, different portions of memory can be dynamically increased and/or decreased in size as demands on the memory are increased and/or decreased and garbage collection more efficiently address these demands.

Each physical block of the memory array can contain a number of physical rows of memory cells coupled to access lines (e.g., word lines). The number of rows (e.g., word lines) in each physical block can be 32, but embodiments are not limited to a particular number of rows per physical block. Further, the memory cells can be coupled to sense lines (e.g., data lines and/or digit lines).

Each row can include a number of pages of memory cells (e.g., physical pages). A physical page refers to a unit of programming and/or sensing (e.g., a number of memory cells that are programmed and/or sensed together as a functional group). Each row can comprise one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a non-limiting example, an apparatus (e.g., the computing system 100) can include a memory sub-system program component 113. The memory sub-system program component 113 can be resident on the memory sub-system 110. As used herein, the term "resident on" refers to something that is physically located on a particular component. For example, the memory sub-system program component 113 being "resident on" the memory sub-system 110 refers to a condition in which the hardware circuitry that comprises the memory sub-system program component 113 is physically located on the memory sub-system 110. The term "resident on" can be used interchangeably with other terms such as "deployed on" or "located on," as referred to herein.

The memory sub-system program component 113 can be configured to monitor a particular superblock and/or determine program pulse counts of the particular superblock to determine whether a number of blocks are bad blocks (i.e., blocks that are no longer functional or that cannot be used to store data), or good blocks (i.e., blocks that are still functioning properly and can continue to be written to and/or read from). The memory sub-system program component 113 can determine to store data in the particular superblock based on the number of good blocks, along with other parameters described below in association with FIGS. 2-4.

Figure 2:
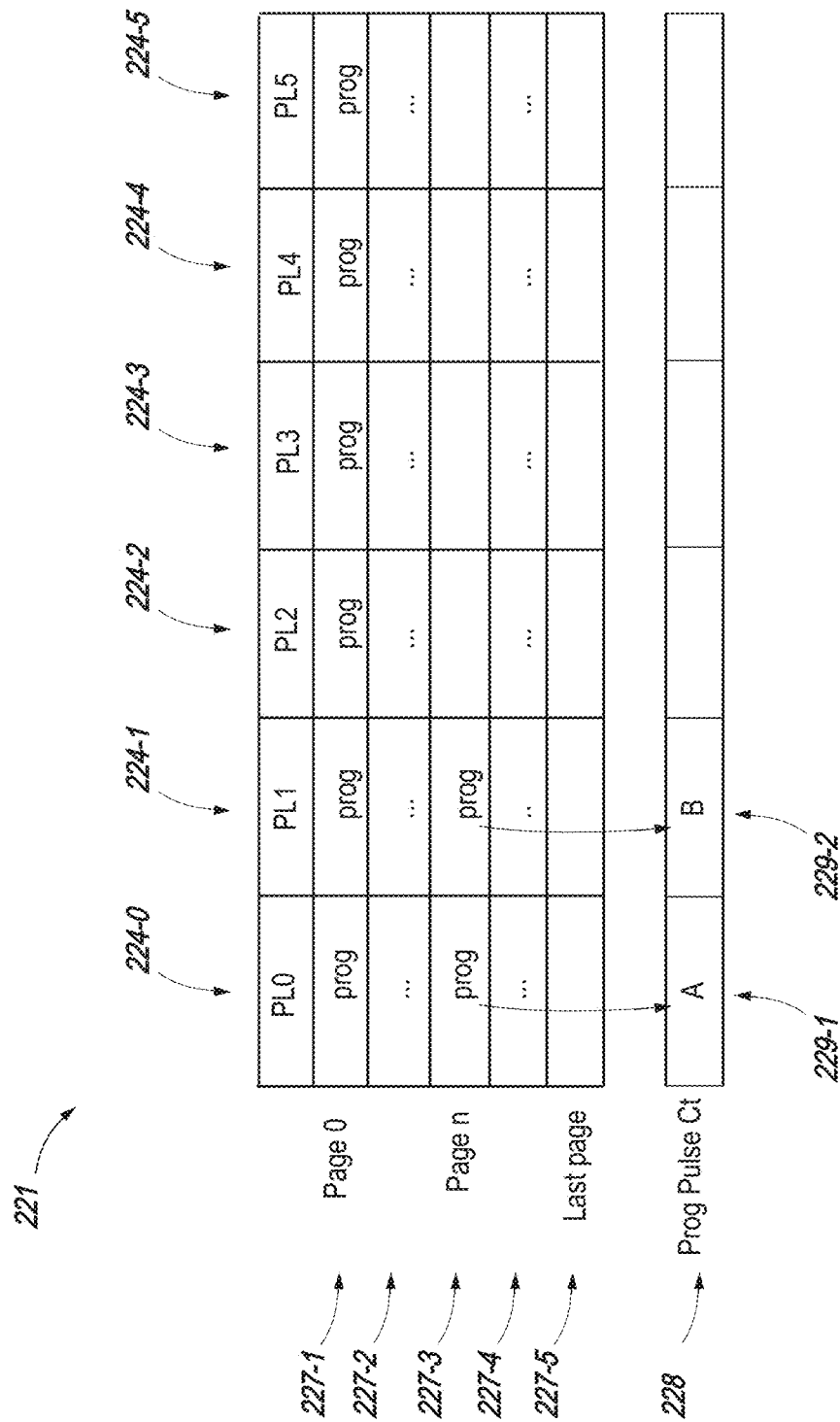
FIG. 2 illustrates an example of a non-volatile memory array for slow program detection in accordance with some embodiments of the present disclosure.

FIG. 2 illustrates an example of a non-volatile memory array 221 for slow program detection in accordance with some embodiments of the present disclosure. In some embodiments, the non-volatile memory array 221 can be a NAND memory array. In some embodiments, the non-volatile memory array 221 can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The non-volatile memory array 221 includes a number of planes ("PL0") 224-0 to ("PL5") 224-5 (hereinafter referred to collectively as number of planes 224). Each of the number of planes 224 can include a quantity of pages ("Page 0") 227-1 to 227-5 ("Last page"). While a particular number of planes are illustrated, examples are not so limited. Any number of pages can be used for such operations. The non-volatile memory array 221 includes a program pulse count ("Prog Pulse Ct") 228. As described above, a number of program operations can include using a multi-plane programming where a block within each of the number of planes 224 are programmed simultaneously. However, in response to at least one of the blocks programming at a slower rate or where a program pulse has a smaller affect on the at least one of the blocks, the multi-plane programming can shift to a single plane programming where each plane is programmed concurrently (e.g., not simultaneously).

During the programming of the blocks of each plane, a program pulse count 228 can be entered in a corresponding column. As an example, in response to programming a first block at a first plane (e.g., "PL0") 224-0 at Page n 227-3, a program pulse count associated with that first block can be stored in the program pulse count row 228, signified by "A" 229-1. Likewise, as an example, in response to a second block of a second plane (e.g., "PL1") 224-1 at Page n 227-3 being programmed, a program pulse count associated with the second block can be stored in the program pulse count row 228, signified by "B" 229-2. In this way, each block that is programmed can be associated with a program pulse count that indicates how many program pulses it took for that particular block to reach its target voltage. As will be described further below in the description of FIG. 3, the program pulse count can be used to determine a median or average program pulse count for a superblock. The median or average program pulse count can be used as a threshold program pulse count or, in some examples, an additional margin of program pulse counts can be added to the median or average program pulse counts to result in the threshold program pulse count. The program pulse count of each corresponding block in that superblock can then be compared to the threshold program pulse count. In response to the program pulse count of the block being above or exceeding the threshold program pulse count, a determination can be made that the block is a bad block (e.g., the block is being programmed too slowly or each program pulse does not have a large enough effect on the voltage of the block) and the block can be decommissioned or no longer used for reading and writing data. In response to the program pulse count of the block being below the threshold program pulse count, a determination can be made that the block is a good block (e.g., the block is being programmed with sufficient speed and can continue to be used for reading and writing data, etc.).

Figure 3:
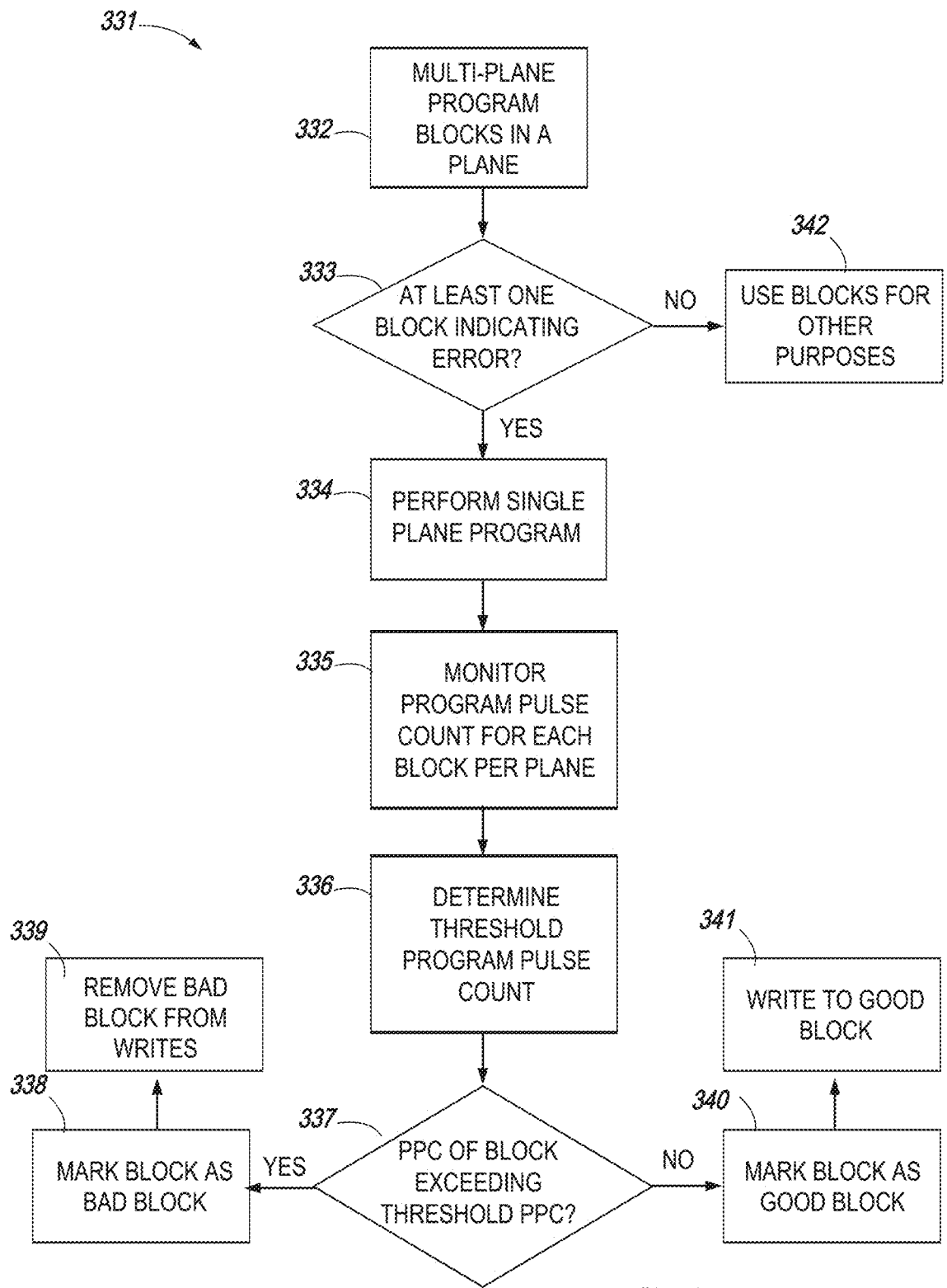
FIG. 3 illustrates an example flow diagram associated with slow program detection in accordance with some embodiments of the present disclosure.

FIG. 3 illustrates an example flow diagram 331 associated with slow program detection in accordance with some embodiments of the present disclosure. At operation 332, a plurality of blocks in a plurality of planes can be programmed using a multi-plane programming. For example, the plurality of blocks can be in a non-volatile memory array (such as an array in memory device 140 in FIG. 1) or a solid state drive (SSD).

At operation 333, the program component can determine whether a full superblock can be built (e.g., set up). As an example, a determination of whether at least one block indicates an error can be performed. The error can be due to at least one block using too many program pulses to be programmed to a target voltage, thereby causing the other blocks to be over-programmed and include an error. At block 342, in response to no block including an error (e.g., "NO"), the blocks can be used for other purposes, such as reading, writing, transferring data, etc.

At operation 334, in response to at least one block indicating an error (e.g., "YES"), a single plane programming can be performed in order to avoid good blocks being designated as bad blocks and bad blocks being designated as good blocks, as is described above. The single plane programming can include programming each block of each plane concurrently rather than simultaneously so that a program pulse count can be determined for each block. At operation 335, each block can be monitored to determine a program pulse count for each block per plane. At operation 336, a threshold program pulse count can be determined to be used to determine whether a program pulse count associated with a particular block is too high or within a range that is acceptable.

At operation 337, a determination of whether the program pulse count (PPC) for a block exceeds the threshold PPC can be performed. For example, in response to a program pulse count of a block exceeding the threshold program pulse count ("YES"), the block may be marked as a bad block and program too slowly (e.g., need too many program pulses to reach the target voltage) and can be indicated as no longer usable. At operation 339, the bad block can be removed from writes and/or reads and no longer used. At operation 340, in response to a program pulse count of a block being equal to or below the threshold PPC (e.g., "NO"), the block may be marked as a good block (e.g., able to be programmed with an acceptable number of program pulses that does not cause other blocks to be overprogrammed). At operation 341, the block can be written to or read from and continue to be used for memory operations.

FIG. 4 is a flow diagram corresponding to a method 445 for performing memory sub-system operations for slow program detection in accordance with some embodiments of the present disclosure. The program component can be analogous to the program component 113 in FIG. 1. The method 445 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 445 is performed by the program component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 446, each of a plurality of planes can be programmed one at a time subsequent to performing a multi-plane programming on a non-volatile memory array. In some examples, a first block in a first superblock in a first plane of the plurality of planes can be programmed. Further, a second block in a second superblock in a second plane of the plurality of planes can be programmed, and so forth.

At operation 447, a program pulse count can be monitored for each block of a super block of each of the respective plurality of planes. In some examples, a program pulse count for the first block and for the second block can be determined. At operation 448, a program pulse threshold can be determined. In some examples, determining a program pulse threshold can include determining a median of a program pulse count per block in a superblock. In some examples, determining a program pulse threshold can include adding a particular quantity of a pulse count to the median program pulse count that results in the threshold pulse count. In some examples, a median program pulse count of the first block and the second block can be determined.

At operation 449, in response to the program pulse count for a respective block within one of the plurality of planes being below a threshold pulse count, a determination can be made that the respective block is a good block. In some examples, a determination of whether the program pulse count for the first block is a particular quantity greater than the median program pulse count can be determined.

Figure 5:
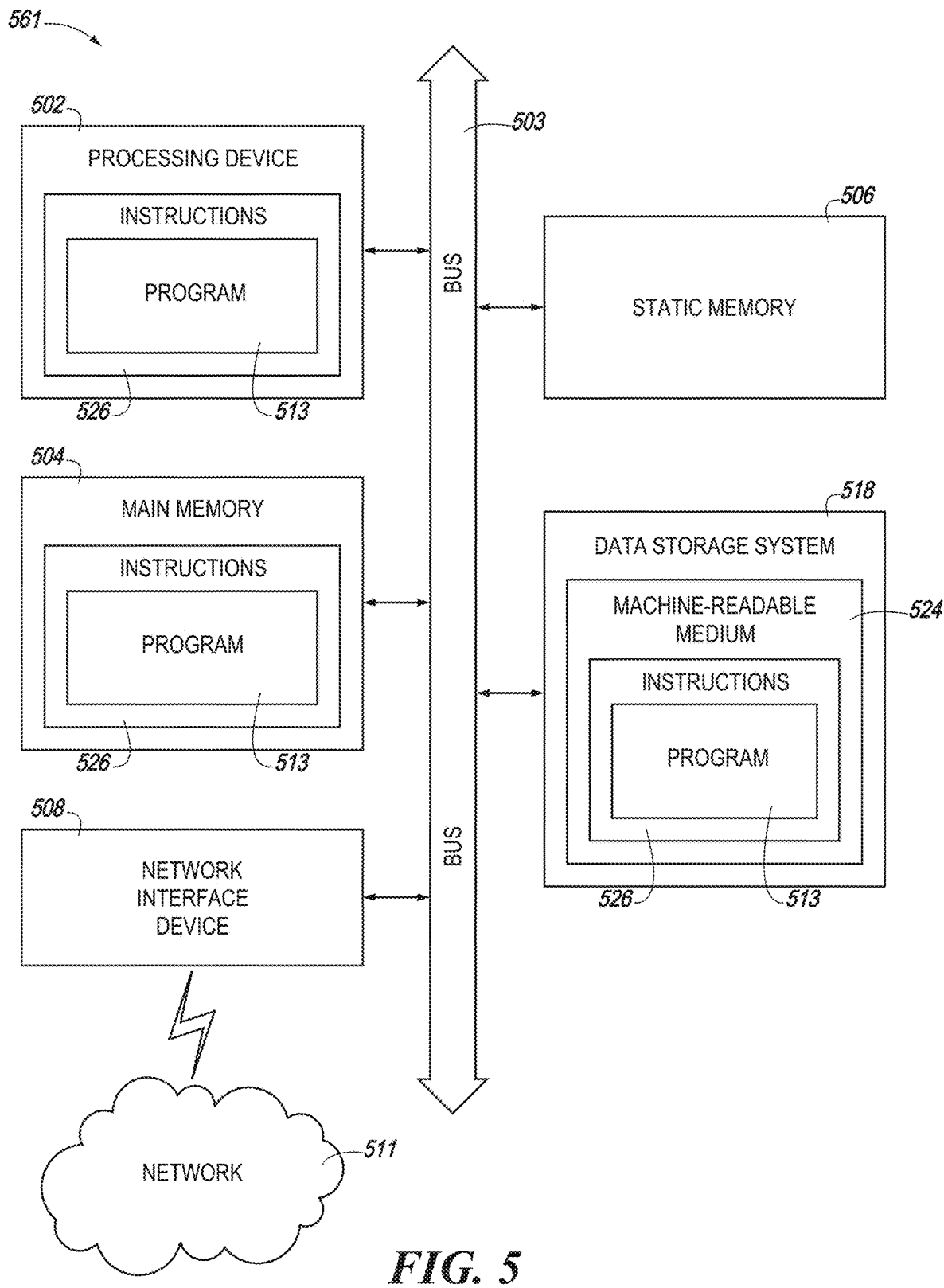
FIG. 5 is a block diagram of an example computer system in which embodiments of the present disclosure may operate.

FIG. 5 is a block diagram of an example computer system 561 in which embodiments of the present disclosure may operate. For example, FIG. 5 illustrates an example machine of a computer system 561 within which a set of instructions, for causing the machine to perform any one or more of the methodologies discussed herein, can be executed. In some embodiments, the computer system 561 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the program component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 561 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 503.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 561 can further include a network interface device 508 to communicate over the network 511.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 561, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a program component (e.g., the program component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including solid state drives (SSDs), hard disk drives (HDDs), floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
  a memory device comprising a plurality of planes of memory; and
  a processing device and a program component, coupled to the memory device, configured to:
    program each of a plurality of planes during different time periods subsequent to performing a multi-plane programming on the memory device;

monitor a program pulse count for each block of the respective plurality of planes; and in response to the program pulse count for a first respective block within one of the plurality of planes being above a threshold pulse count determine that the first respective block is a bad block, wherein the threshold pulse count is determined at least in part by a median of the program pulse count for each block of the respective plurality of planes.

2. The apparatus of claim 1, wherein the program component is configured to, in response to the program pulse count for a second block within one of the plurality of planes being below the threshold pulse count, determine that the second respective block is a good block.

3. The apparatus of claim 2, wherein the program component is configured to, in response to the second block being a good block, use the second block in subsequent programming operations.

4. The apparatus of claim 1, wherein the program component is configured to, in response to the first respective block being a bad block, decommission the first respective block and not use the first respective block for subsequent programming operations.

5. The apparatus of claim 1, wherein the program component is configured to determine the threshold pulse count by adding a particular quantity of a pulse count to the median program pulse count that results in the threshold pulse count.

6. The apparatus of claim 1, wherein the program component is configured to, in response to the first respective block being a bad block, use a third respective block within one of the plurality of planes to replace the first respective block.

7. The apparatus of claim 1, wherein the memory device is a NAND memory array resident on a mobile computing device.

8. A method, comprising:
programming each of a plurality of planes one at a time subsequent to performing a multi-plane programming on a non-volatile memory array;
monitoring a program pulse count for each block of the respective plurality of planes;
determining a threshold program pulse count at least in part by a median of the program pulse count for each block of the respective plurality of planes; and
in response to the program pulse count for a respective block within one of the plurality of planes being below the threshold program pulse count, determining that the respective block is a good block.

9. The method of claim 8, wherein determining the threshold program pulse count comprises determining a median of the program pulse count per block in a superblock.

10. The method of claim 8, wherein determining the threshold program pulse count comprises adding a particular quantity of a pulse count to the median of the program pulse count for each block of the respective plurality of planes that results in the threshold program pulse count.

11. The method of claim 8, comprising:
programming a first block in a first superblock in a first plane of the plurality of planes; and
programming a second block in a second superblock in a second plane of the plurality of planes.

12. The method of claim 11, comprising determining the program pulse count for the first block and for the second block.

13. The method of claim 12, comprising determining a median program pulse count of the first block and the second block.

14. The method of claim 13, comprising determining whether the program pulse count for the first block is a particular quantity greater than the median program pulse count.

15. An apparatus, comprising:
a memory device comprising a plurality of planes of memory; and
a processing device coupled to the memory device, the processing device configured to:
program a plurality of blocks of each of the plurality of planes on a block by block basis;
monitor a program pulse count for each of the plurality of blocks of the plurality of planes;
determine that at least one of the plurality of blocks include a program pulse count that exceeds a threshold program pulse count by adding a particular quantity to a median of the program pulse count for each of the plurality of blocks of the plurality of planes;
mark the at least one of the plurality of blocks as a bad block and prevent writing to the bad block; and
replace the bad block with a different block that has been determined to be a good block.

16. The apparatus of claim 15, wherein the processing device is configured to determine that the different block is a good block based on the program pulse count associated with the different block being below the threshold program pulse count.

17. The apparatus of claim 15, wherein the processing device is configured to determine the threshold program pulse count by determining the median program pulse count for each of the plurality of blocks of the plurality of planes.

18. The apparatus of claim 15, wherein;
the processing device is configured to determine that at least one of the plurality of blocks include a program pulse count that is below the threshold program pulse count; and
in response to the program pulse count of the at least one block being below the threshold program pulse count, write data to the at least one of the plurality of blocks.

* * * * *